United States Patent
Bockwoldt et al.

(10) Patent No.: US 8,739,688 B2
(45) Date of Patent: Jun. 3, 2014

(54) DEVICE FOR SUPPLYING MILK

(75) Inventors: Peter Bockwoldt, Albershausen (DE);
Armin Startz, Weidenstetten (DE)

(73) Assignee: WMF Wuerttembergische Metallwarenfabrik AG, Geislingen (DE)

( * ) Notice: Subject to any disclaimer, the term of this patent is extended or adjusted under 35 U.S.C. 154(b) by 735 days.

(21) Appl. No.: 12/307,760

(22) PCT Filed: Jul. 16, 2007

(86) PCT No.: PCT/EP2007/006299
§ 371 (c)(1),
(2), (4) Date: May 12, 2009

(87) PCT Pub. No.: WO2008/006623
PCT Pub. Date: Jan. 17, 2008

(65) Prior Publication Data
US 2009/0314165 A1    Dec. 24, 2009

(30) Foreign Application Priority Data

Jul. 14, 2006  (EP) .................................... 06014893

(51) Int. Cl.
*A47J 31/44*     (2006.01)
*A47J 31/00*     (2006.01)

(52) U.S. Cl.
USPC ............ 99/293; 99/323.1; 99/453; 134/22.12

(58) Field of Classification Search
USPC ................... 99/323.1, 293, 302 R, 452, 453; 134/22.11, 22.12
See application file for complete search history.

(56) References Cited

U.S. PATENT DOCUMENTS

| 2,961,853 | A |   | 11/1960 | Cohrt |
|---|---|---|---|---|
| 3,132,656 | A |   | 5/1964 | Rankin |
| 5,931,080 | A | * | 8/1999 | Roure Boada ................. 99/293 |
| 6,019,032 | A | * | 2/2000 | Arksey ............................ 99/452 |
| 6,959,642 | B1 | * | 11/2005 | Landolt ........................... 99/455 |
| 7,448,314 | B2 | * | 11/2008 | Ioannone et al. ............... 99/452 |
| 7,681,491 | B2 | * | 3/2010 | Agon et al. ..................... 99/293 |
| 7,913,614 | B2 | * | 3/2011 | Fukushima et al. .......... 99/323.1 |
| 2004/0118291 | A1 | * | 6/2004 | Carhuff et al. ................. 99/275 |
| 2009/0011110 | A1 | * | 1/2009 | Gotlenboth .................... 426/594 |

FOREIGN PATENT DOCUMENTS

| DE | 4445436 | 6/1996 |
|---|---|---|
| EP | 344859 | 12/1989 |
| EP | 0791321 A1 | 8/1997 |
| EP | 1386880 | 2/2004 |
| JP | 2005335768 A | 12/2005 |
| JP | 2005335968 A | 12/2005 |

* cited by examiner

*Primary Examiner* — Reginald L Alexander
(74) *Attorney, Agent, or Firm* — Marshall, Gerstein & Borun LLP

(57) ABSTRACT

A device for supplying milk from a storage tank to a dispensing element, having a supply line with an inlet end which is detachably connected to the storage tank, to improve the cleaning of such a device. A cleaning device is provided for the supply line, the cleaning device containing a hot water and/or water vapor outlet having a connection device for the detachable connection of the inlet end of the supply line.

10 Claims, 4 Drawing Sheets

DEVICE FOR SUPPLYING MILK

The present application claims the benefit of priority of International Patent Application No. PCT/EP2007/006299, filed Jul. 16, 2007 which application claims priority of European Patent Application No. 06014893.9, filed Jul. 14, 2006. The entire text of the priority application is incorporated herein by reference in its entirety.

FIELD OF THE DISCLOSURE

The disclosure relates to a device for supplying milk, and particularly a cleaning device for a device for supplying milk.

BACKGROUND

Such a device is known from EP 344 859. The known device serves to dispense heated milk and further contains a frothing device, by means of which the milk can additionally be frothed. Most different operating principles of frothing devices for milk are known. In the device described, for example, the milk is drawn in from a storage tank by means of the Venturi principle. This is accomplished through a supply line in the form of a hose, the outlet end of which is connected to the frothing device and the inlet end of which is simply inserted into a storage tank for milk. A problem involved by all milk handling devices is the cleaning. Milk is a perishable product, so that the components coming into contact with milk should be cleaned as often and as thoroughly as possible. Inside the heating and frothing device this is not so problematical because steam is used therein, so that the frothing device is relatively easy to clean with a pure steam blast, without the introduction of milk, whereby, at least until the next thorough cleaning procedure involving the disassembly of the components and/or the use of cleaning agents, the growth of bacteria is safely prevented. However, as there is no natural way for the steam into the supply line, the supply line can, in this manner, not or at least not sufficiently be cleaned. In connection with the known device it is, therefore, proposed to place the inlet end of the supply line into a cleaning liquid in the meantime and, by operating the device, to draw in the cleaning liquid instead of milk through the supply line. However, this is complicated and may not lead to the desired result. To thoroughly clean the supply line, also hot, nearly boiling water could be used, which is difficult to handle, however, and is not always available either. Cold or merely warm water does not bring about the desired cleaning result. If chemical cleaning agents are used, a complicated rinsing has to be performed afterwards to make sure that all residues are removed from the device.

SUMMARY OF THE DISCLOSURE

Therefore, the disclosure concerns a device of the above-described type further to facilitate the cleaning.

The embodiment according to the disclosure provides for a very effective cleaning system for the milk-conducting supply line. The use of hot water and/or steam, which are provided for conveying or heating the milk anyhow, allows an effective cleaning of the supply line. To this end, merely a hot water and/or steam outlet has to be provided, unless it is already provided anyhow (which is the case in most coffee machines), and the user merely has to remove the inlet end of the supply line from the milk storage tank and fix it to the outlet so as to be able to perform the cleaning procedure.

In order to facilitate replugging the inlet end of the supply line, the outlet is preferably arranged in the region of the storage tank.

If the cleaning is accomplished with hot water, residual hot water left in the supply line should be removed so as to avoid jeopardizing the user. This can be accomplished with the most various measures.

In order to facilitate replugging the supply line, the connecting device may comprise a specifically adapted coupling piece. It is also possible, however, to adapt the dimensions of the outlet to the dimensions of the supply line in such a way that both can be plugged into one another.

The supply line can be fixed either into or to the storage tank. A particularly preferred and easy to clean embodiment is achieved if the supply line is fixed to the storage tank, namely to an intake nozzle permanently integrated into the storage tank. By this, the intake nozzle can be easily cleaned together with the storage tank, e.g. in a dishwasher, while an interior cleaning of the supply line takes place in the manner according to the disclosure.

Particularly advantageous is the use of the device according to the disclosure in a coffee machine, wherein the hot water outlet or steam outlet, respectively, which is provided in coffee machines anyhow, is provided according to the disclosure with the connecting device in such a way that the supply line can be fixed to the same.

BRIEF DESCRIPTION OF THE DRAWINGS

Embodiments of the disclosure shall be explained in more detail by means of the drawings below: In the drawings.

DETAILED DESCRIPTION OF THE PREFERRED EMBODIMENT

Figure 1:
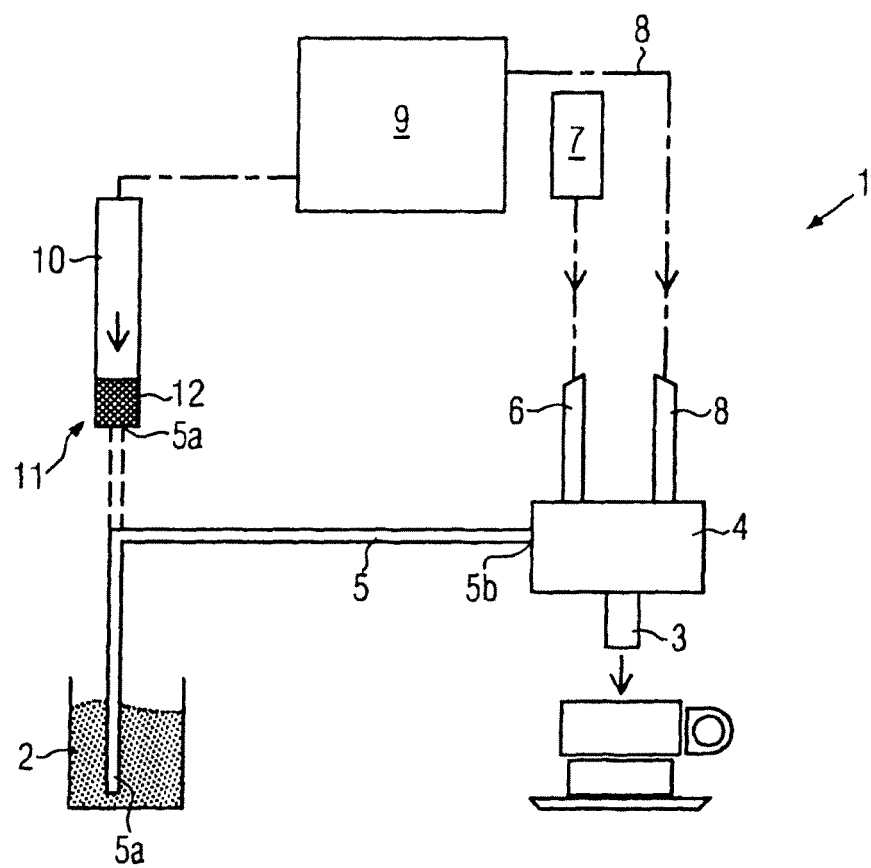
FIG. 1 shows a schematic representation of a first principle of the disclosure.

FIG. 1 shows a first embodiment of an the disclosed device 1 for supplying milk from a storage tank 2 to a dispensing device 3. The device 1, which is only illustrated as a schematic diagram, may be a part of any device handling milk in the described manner. In the embodiment shown, the device 1 is designed as a device for preparing and dispensing heated milk froth and comprises, to this end, a frothing device 4, which may constructed in a manner known per se, e.g. the frothing device according to DE 44 45 436. The operating mode and the constructional design of frothing devices are known and need not be explained.

The frothing device 4 is connected to the storage tank 2 for the milk by a supply line 5. The supply line 5 is detachably fixed with its inlet end 5a into or to the storage tank 2. In the embodiment shown, it is simply placed into the storage tank 2. The outlet end 5b of the supply line 5 is fixed to the frothing device 4, where it may likewise be mounted in a detachable manner so as to allow a disassembly for a basic cleaning procedure. Preferably, the supply line 5 is flexible, and specifically is a flexible hose made of plastic or rubber.

In the embodiment shown, the frothing device 4 is supplied with air through a line 6, whereby the air is drawn in either according to the Venturi principle or is provided as compressed air, e.g. by a compressed air source 7 such as a compressed air cartridge or a pump or the like.

Through another line 8 the frothing device 4 is supplied with steam for heating the milk. The line 8 is connected to an appropriate steam generator 9. The steam generator 9 is of a conventional type and may be designed, for example, as a flow heater. However, preferably a combined hot water and steam generator is used, which supplies not only steam for the frothing device 4, but also hot water for a hot water outlet 10. The hot water outlet 10, through which also steam portions can be discharged, is accessible to the user and arranged in such a way that it is located in the region of the inlet end 5*a* of the supply line 5, if the supply line 5 is connected to the frothing device 4. The hot water outlet 10 should be arranged with a distance from the outlet end 5*b* of the supply line 5, which distance is equal to or smaller than the total length of the supply line 5 between the inlet and outlet ends 5*a*, 5*b*. Preferably, the hot water outlet 10 is arranged in the region of the storage tank 2 for the milk.

The hot water outlet 10 and/or the inlet end 5*a* of the supply line 5 are provided with a connecting device 11. In the embodiment shown, the connecting device 11 comprises a coupling piece 12, which is fixed to the hot water outlet 10. However, the connecting device 11 can also be formed by corresponding connecting pieces at the outlet 10 and at the inlet end 5*a*, or by a coupling piece alone at the inlet end 5*a*. The connecting device may be of any appropriate construction, e.g. in the form of a locking connection, a plug-in connection or a bayonet connection, which is suited to realize an easily detachable connection between the supply line 5 and the outlet 10, by simultaneously withstanding the mechanical loads exerted by the hot water discharged or pressed out under pressure. Moreover, it is possible to realize the connecting device 11 by merely adapting the dimensions between the outer and inner dimensions of the outlet 10 and the inlet end 5*a*, so that the inlet end 5*a* and the outlet 10 can simply be plugged together. This is particularly expedient if the inlet end 5*a* has a certain material elasticity, which is the case, for example, with a hose made of rubber or plastic.

The outlet 10 together with the connecting device 11 for the inlet end 5*a* of the supply line 5 form a cleaning device for the supply line 5.

The device 1 according to the disclosure is commonly operated to prepare and dispense milk froth, to heat and dispense heated milk or to dispense cold milk, whereby the frothing of milk is accomplished by supplying air and steam into the frothing device 4, which draw in milk from the storage tank 2 through the supply line 5 and dispense milk froth ready to use through the dispensing device 3. If the milk is to be heated only, merely steam is supplied into the frothing device 4, which draws in milk from the storage tank 2 and dispenses heated milk through the dispensing device 3. If milk only is to be dispensed, only air is supplied into the frothing device 4, which draws in milk from the storage tank 2 and dispenses the cold milk through the dispensing device 3.

The cleaning of the frothing device 4 can be accomplished in the usual manner by means of a steam blast. However, in order to be able to clean the supply line 5 as well, the inlet end 5*a* of the supply line 5 is disconnected from the storage tank 2, i.e., in the embodiment shown, is drawn out of the storage tank 2 and is connected to the hot water outlet 10, while the outlet end 5*b* of the supply line 5 remains connected to the dispensing device 3 and the frothing device 4. Then, requested via an operating element, preferably by the user, a gush of hot water is conducted from the outlet 10 into the supply line 5 for some time, e.g. for some seconds. This gush of hot water thoroughly rinses the supply line 5 and simultaneously also cleans the components of the frothing device 4 and the dispensing device 3 contaminated by the milk, and is subsequently discharged through the dispensing device 3.

Due to the high temperature of the hot water, especially if it is provided by a combined hot water/steam generator 9, it should be made sure that no residual hot water is left in the supply line 5 when the inlet end 5*a* of the supply line 5 is separated again from the outlet 10. This can be accomplished with the most different measures. For example, the arrangement and the constructive design of the components may be chosen such that the outlet end 5*b* of the supply line 5 is located at the deepest point of the supply line 5, so that the residual hot water flows out under the influence of gravity. If a flow heater is used for preparing hot water, it can be ensured by appropriately controlling same that the heater is switched off prior to the end of the cleaning procedure, so that only cold water is left in the supply line 5 after the end of the cleaning procedure. If also steam is available at the hot water outlet 10, a steam blast can be discharged via the outlet 10 at the end of the cleaning procedure, which presses residual hot water out of the supply line. If the frothing in the frothing device 4 is accomplished by means of steam, as is shown in FIG. 1, it is further possible to blow steam through line 8 into the frothing device 4, which draws in the residual hot water from line 5.

Figure 2:
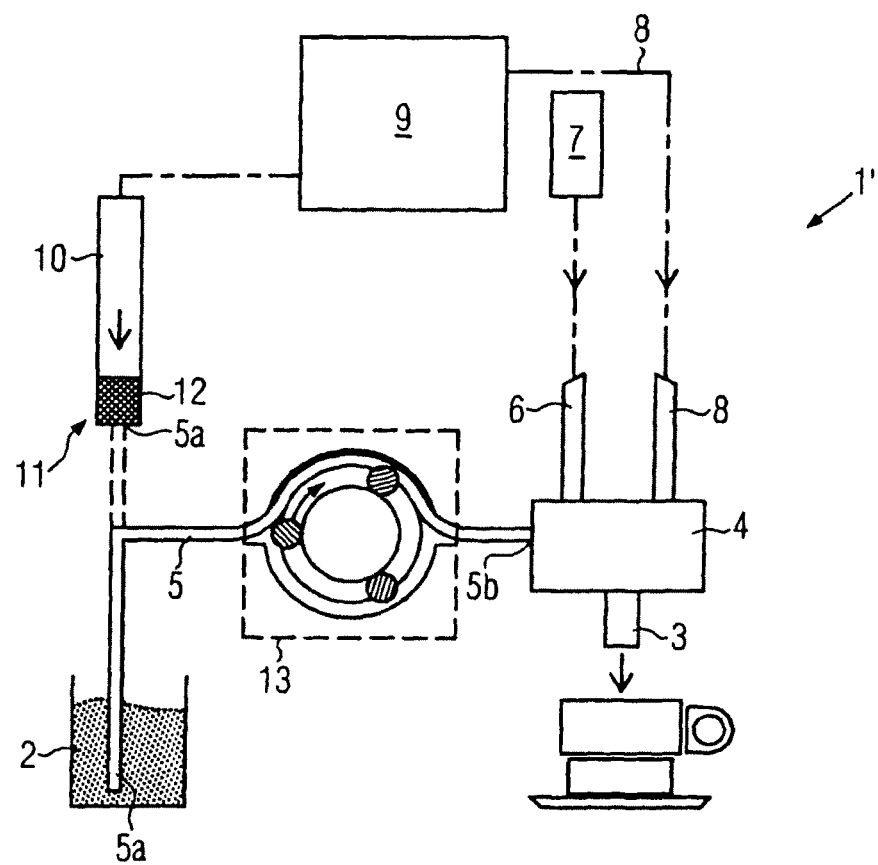
FIG. 2 shows a schematic representation of a second principle of the disclosure.

FIG. 2 shows a device 1' according to the disclosure, which differs from device 1 according to FIG. 1 only by the details described below, whereby like or comparable components are designated with like reference numbers and shall not be explained again.

The device 1' merely differs from device 1 in that the introduction of the milk from the storage tank 2 into the dispensing device 3 and the frothing device 4, respectively, is accomplished or supported, respectively, by a pump 13. The pump 13 is mounted in the supply line 5 between the inlet end 5*a* in the storage tank 2 and the outlet end 5*b* at the frothing device 4. The operation of device 1' and the cleaning procedure correspond to the methods already explained by means of FIG. 1. Merely the driving out of residual hot water can here be accomplished in a simple manner by actuating the pump 13.

Figure 3:
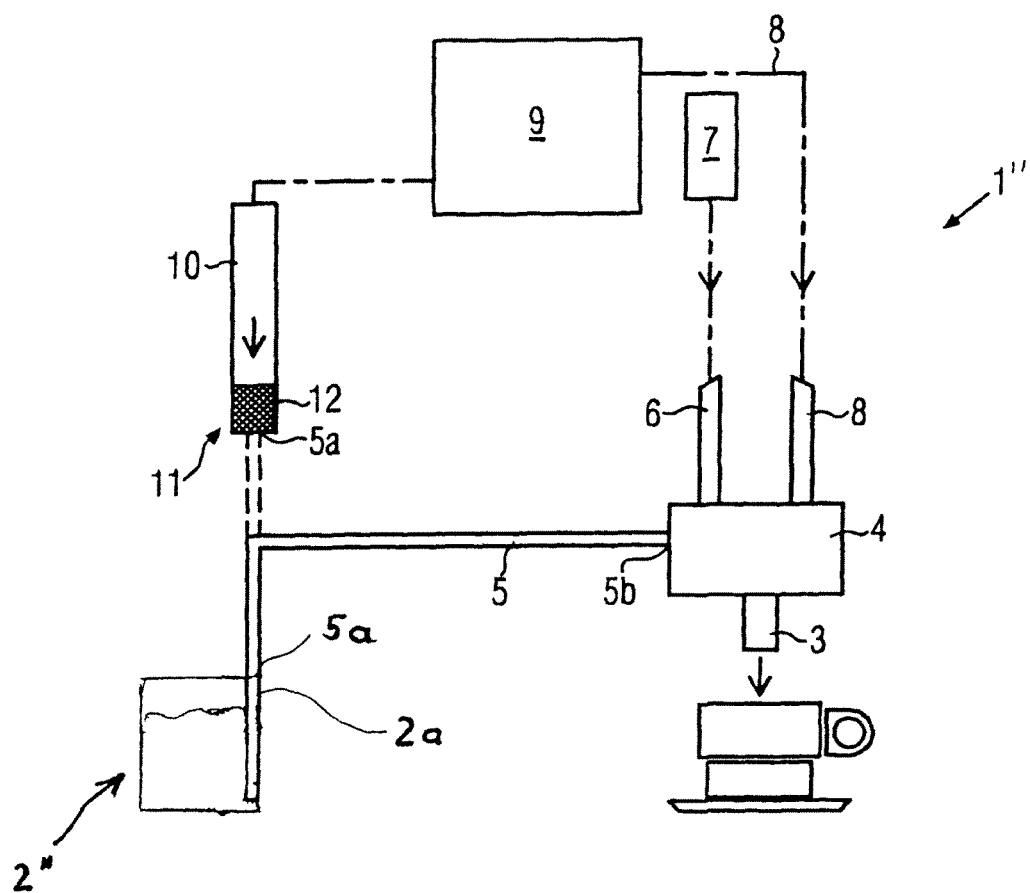
FIG. 3 shows a schematic representation of a third principle of the disclosure.

FIG. 3 shows another embodiment of a device 1" according to the disclosure, which differs from devices 1 and 1' according to FIG. 1 and FIG. 2 only by the details described below, whereby like or comparable components are designated with like reference numbers and shall not be explained again.

Device 1" merely differs by a modified storage tank 2", which comprises the milk receiving space and an intake nozzle 2*a* fixed to the storage tank. In the embodiment shown, the intake nozzle 2*a* is connected to the storage tank 2" in such a way that both can be cleaned together in a dishwasher without problems. Thus, the intake nozzle 2*a* is connected to the storage tank 2" either permanently or detachably. The intake nozzle is dimensioned and arranged in such a way that the inlet end 5*a* of the supply line 5 is detachably connected to the intake nozzle 2*a* outside of the milk level in the storage tank 2". In the embodiment shown, the intake nozzle is a small tube vertically immersed into the storage tank 2", which comprises an intake opening slightly above the bottom of the storage tank 2" and reaches over the milk level in the storage tank 2", where it can be connected to the inlet end 5*a* of the supply line 5, whereby the inlet end 5*a* is preferably fitted onto the intake nozzle 2*a*. For cleaning purposes the inlet end 5*a* is removed from the intake nozzle 2*a* and is connected to the connecting device 11.

Figure 4:
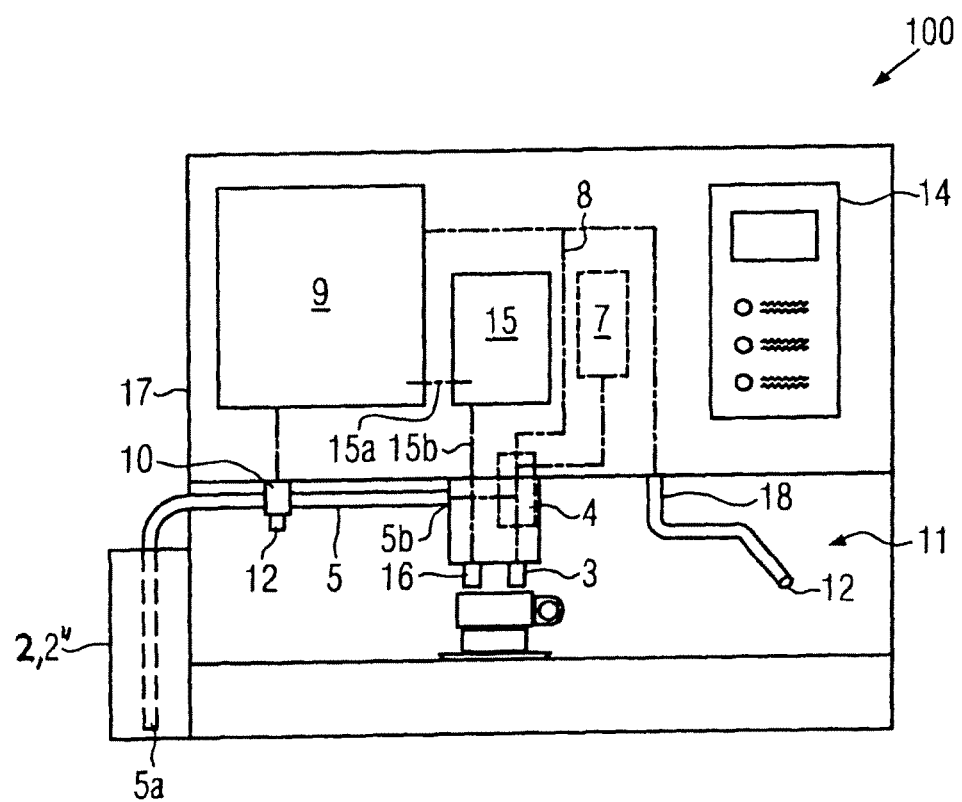
FIG. 4 shows a schematic representation of a coffee machine according to the disclosure.

The devices 1, 1', 1" according to the disclosure may be designed as separate devices, but may also be integrated in a coffee machine 100 according to FIG. 4. The coffee machine equipped according to the disclosure is of the standard type, i.e. is constructed as a semiautomatic or fully automatic machine and is controlled by a non-illustrated control unit.

The coffee machine 100 comprises a casing 17, in which and on which the standard elements of coffee machines are mounted. By an operating element 14 the user may request various beverages, which are then automatically prepared and dispensed by the coffee machine.

To this end, the coffee machine 100 comprises, for example, a standard boiling unit 15, which is supplied with hot water from the hot water apparatus 9 through a line 15a and which is connected to a coffee outlet 16 by a line 15b. The coffee machine 100 further comprises the already described frothing device 4 with the supply line 5. In the embodiment shown, the storage tank 2 for milk is, for example, a commercially available milk carton, which is accommodated in a holder. However, the storage tank 2 may also be a preferably cooled chamber in the interior of the casing 17 of the coffee machine 100.

The coffee machine 100 is provided with one of the standard hot water outlets 10, as are provided on many coffee machines to allow the preparation of tea. The coffee machine 100 further comprises a separate steam outlet 18, which is formed as a pivoted lever and serves, for example, to heat beverages and other liquids (soups).

The hot water outlet 10 and/or the steam outlet 18 are provided with the connecting device 11 for connecting the inlet end 5a of the supply line 5. In the embodiment shown, coupling elements 12 are provided on both connections.

In the embodiment shown, the hot water outlet 10 is arranged in the proximity of the storage tank 2, 2" so as to allow the easy connection of the supply line 5 thereat. Although the steam outlet 18 is located on the side of the frothing device 4 which faces away from the storage tank 2, 2", the distance between its coupling piece 12 and the frothing device 4 is smaller than the length of the supply line 5, so that the inlet end 5a can also be connected to the steam outlet 18.

In the coffee machine 100, too, the cleaning procedure for the supply line 5 can be performed in a way already described by means of FIGS. 1 to 3, whereby the supply line 5 is cleaned either with hot water or with steam. To this end, the user, once he has connected the inlet end 5a to the hot water or steam outlet 10, 18, has to initiate by means of the operating element 14 either the discharge of a hot water blast for a preparation of tea or the discharge of a steam blast for heating purposes, depending on where the supply line 5 is connected.

Also the driving out of residual hot water may be accomplished in the above-described manner.

The cleaning procedure according to the disclosure can take place either during a general cleaning of the device or the coffee machine, respectively, but can preferably be performed as an intermediate cleaning step, if necessary each time after milk was dispensed. Thus, the increase of harmful germs is effectively suppressed. The intake nozzle could also be fixed to the storage tank in another way, for example, it could laterally penetrate through the wall of the storage tank or extend out of the bottom. However, the storage tank provided with an intake nozzle also facilitates the cleaning of coffee machines or other milk dispensing apparatus not comprising a connecting device, i.e. the supply line of which has to be cleaned in the conventional way.

The invention claimed is:

1. Coffee machine, comprising:
   one of a hot water and a steam outlet,
   a dispensing device,
   a milk storage tank,
   a frothing device for milk arranged between said dispensing device and said milk storage tank,
   a supply line for milk connected to the frothing device detachably connected at an inlet end to the storage tank, and
   a cleaning device for the supply line for milk, the cleaning device having the at least one of said hot water outlet or said steam outlet, and further comprising a connecting device, wherein in a first operational configuration, the connecting device detachably connects an inlet end of the supply line for milk to the milk storage tank, and in a second operational configuration, the connecting device detachably connects the inlet end of the supply line for milk to the at least one of said hot water outlet or said steam outlet for cleaning.

2. Coffee machine according to claim 1, wherein the at least one of the hot water outlet and steam outlet is arranged in a region of the storage tank.

3. Coffee machine according to claim 1, wherein the cleaning device comprises a hot water outlet and a device for removing residual hot water from the supply line.

4. Coffee machine according to claim 1, wherein the connecting device comprises a coupling device.

5. Coffee machine according to claim 1, wherein the connecting device is formed by a plug-in connection with a dimensional adaptation between the inlet end of the supply line and an outlet end of the at least one of hot water outlet and steam outlet.

6. Coffee machine according to claim 1, wherein the inlet end of the supply line is fixed to the storage tank.

7. Coffee machine according to claim 1, wherein the connecting device comprises a coupling piece.

8. Method for operating a coffee machine according to claim 1, comprising disconnecting the inlet end of the supply line from the storage tank, connecting the inlet end of the supply line to at least one of a hot water outlet and steam outlet, and subsequently effecting one of a hot water and steam discharge into the supply line.

9. Method according to claim 8, wherein after the cleaning with hot water, removing residual hot water left in the supply line.

10. Method according to claim 9, and one of rinsing out, sucking off, or driving out the residual hot water.

* * * * *